Dec. 24, 1968   HANS-DIETER KINNER   3,417,728
FLUID-ACTIVATED INDICATOR
Filed May 22, 1967

INVENTOR.
HANS-DIETER KINNER
BY David E. Hopper
ATTORNEY

United States Patent Office

3,417,728
Patented Dec. 24, 1968

3,417,728
FLUID-ACTIVATED INDICATOR
Hans-Dieter Kinner, Attleboro, Mass., assignor to The Foxboro Company, Foxboro, Mass., a corporation of Massachusetts
Filed May 22, 1967, Ser. No. 640,025
7 Claims. (Cl. 116—70)

ABSTRACT OF THE DISCLOSURE

A cylindrical housing is enclosed by a convex-concave translucent lens at a first end thereof; a colored ball having a diameter slightly less than the cylindrical housing interior diameter is enclosed therein; a fluid pressure supplied to the second end of the cylinder operates to conformably impress the ball against the inner concave face of the lens, thereby illuminating the lens for large viewing angles about the housing center line; pressure aspiration at the second end of the cylindrical housing operates to withdraw the colored ball from the lens, thereby darkening the lens; a constant aspiration bias may be employed in conjunction with a controlled pressure signal to actuate the indicator in response to a fluidic binary signal.

---

This invention relates to indicators, and more particularly to fluidic indicators of the type having a movable member that may be actuated to a position proximate the inner face of a translucent lens.

Fluidic indicators have been developed employing a movable fluorescent member in conjunction with a transluscent plastic lens, the fluorescent member being pushed by a fluidic pressure next to the lens so that the lens thereby appears illuminated; when the fluorescent member is withdrawn from the lens, the lens appears darkened. Typically, the fluorescent member is moved to a position proximate the inner surface of the lens by fluidic pressure, and a spring return is employed to move the fluorescent member away from the lens at times when the fluidic pressure is absent. These indicators require, in practice, a relatively high pressure level for actuation, even though a spring having a minimal force is incorporated with the indicator. In addition, these indicators have the disadvantage that illumination is readily apparent from only relatively narrow angles of viewing about the center line of the indicator.

The present invention provides a fluidic indicator employing a ball with a high-purity color or a fluorescent surface enclosed in a cylindrical passage terminated by a convex-concave transluscent lens on one end of the passage, and terminated by a fluidic pressure connection at the other end of the passage. The ball is preferably spherical and is slightly smaller than the diameter of the cylindrical passage so that it may be readily moved from end-to-end thereof irrespective of the orientation of the indicator housing, with a minimal application of fluidic pressure. Apparent illumination for all viewing angles about the indicator center line is achieved by making the concave inner face of the translucent lens conformable with the spherical surface of the ball so that contact therebetween is made over a relatively large surface area; as a consequence visible imaging is passed through the lens in a manner providing wide image distribution through all viewing angels about the center line of the indicator. A constant aspiration bias may be used to provide for the darkened condition of the indicator, the bias tending to move the ball away from the lens at times the pressure signal is absent.

Figure 1:
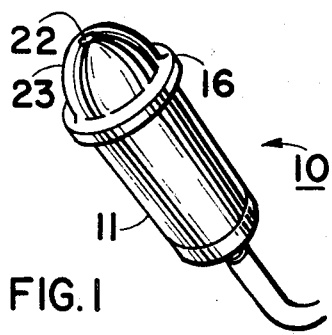
Figure 2:
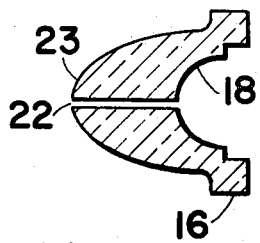
Figure 3:
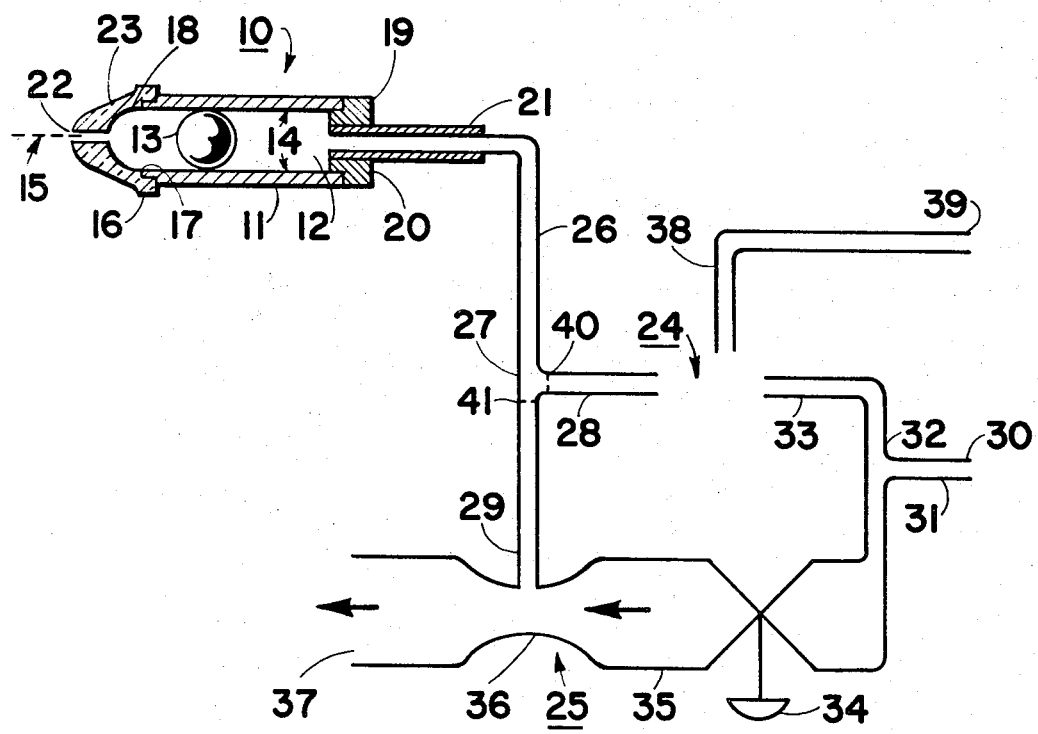

These and other advantages of the invention may be seen in the specification herewith, and in the following figures in which:

FIGURE 1 is a three-dimensional view of an embodiment of the indicator of the invention;
FIGURE 2 is a cross-sectional view of the indicator with a fluidic circuit for translating a binary signal into the activated and de-activated conditions of the indicator;
FIGURE 3 is a cross-sectional view of a magnifying lens.

Referring to FIGURES 1 and 2, indicator 10 has a cylindrical housing 11 with a recess 12 therein. Member 13 is disposed within recess 12 of cylindrical housing 11, member 13 preferably being a spherical ball, but may be a piston having a spherically-shaped end. Spherical ball 13 has a diameter allowing a slight clearance between ball 13 and the inner diameter 14 of recess 12, so that ball 13 may be moved freely therein along center line 15 of cylindrical housing 11. A convex-concave lens 16 is affixed to end 17 of cylinder 11, thereby enclosing end 17. Lens 16 preferably has a concave inner surface 18 with a spherical curvature matching closely the curvature of ball 13. The other end 19 of cylindrical housing 11 is enclosed by end fitting 20 having a fluidic pressure connection 21 therethrough, conveniently located centrally with end fitting 20. Application of a low fluidic pressure to fluidic connection 21 causes a pressure buildup from end fitting 20 in recess 12 of cylindrical housing 11 thereby tending to move ball 13 toward end 17 of cylindrical housing 11, eventually pressing ball 13 against the concave inner surface 18 of lens 16; pressure in recess 11 between ball 13 and inner concave surface 18 is allowed to egress to atmosphere through aperture 22 which is conveniently located through lens 16 on center line 15 of indicator 10. Ball 13 has a surface which may be any color desired including white, but for best viewing is preferably a high purity color or a fluorescent color. When ball 13 is in contact with inner surface 18 of lens 16, the surface of ball is thereby conformably in contact with inner concave surface 18 of lens 16. This contact, if the curvatures of ball 12 and surface 18 are matched, operates to provide apparent illumination through lens 16 to all angels of viewing about center line 15 from which the convex outer surfaces 23 of lens 16 is visible. The convex outer surface 23 may be spherical, corresponding to the curvatures of inner surface 18 of lens 16, or convex outer surface 23 may have some other curvature, so that the focal point of lens 16 is approximately at a position such as a curvature effectively magnifying ball 13 when it is in place against lens 16. Referring to FIGURE 3, convex outer surface 23 of lens 16 may be shaped to thicken lens 16 through a narrow viewing angle about center line 15 so that illumination will be effectively magnified to a degree when viewing indicator 10 head on along center line 15.

Darkening of indicator 10 is achieved by the withdrawal of ball 13 away from contact with inner concave surface 18 of lens 16; the withdrawal may readily be achieved by low pressure aspiration at fitting 21, the pressure aspiration causing a lowering of pressure in recess 12. The atmospheric pressure communicating through aperture 22 causes a pressure differential tending to move ball 13 toward and against end fitting 20 of housing 11. Aperture 22 allows atmospheric pressure to enter the space enlarged between lens 16 and ball 13 during its withdrawal towards end fitting 20 of housing 11.

Ball 13 may be made with a cylindrical piston shape if desired, so long as the end of ball 13 toward end 17 of housing 11 has a suitable shape so that conformable contact may be made between ball 13 and inner surface 18 of lens 16.

It is found that the indicator of the invention functions with exceptionally low applied and aspirating pressures, in the order of about one-inch of water, and the indicator functions well with all orientations of center line 15. These functions are facilitated by the absence of a spring return or other mechanical linkages with ball 13. The illumination achieved by the configuration of the spherical surface of ball 13 with lens 16 yields an apparent illumination readily seen from all viewing angles about center line 15, even from a viewing angle almost at right angles to center line 15, so long as surface 23 of lens 16 may be seen. This result thereby provides an indicator which cannot easily be misinterpreted, giving as it does a positive indication of a difference between the actuated condition and the non-actuated condition, from whatever angle it may be viewed.

Actuation of indicator 10 may be conveniently obtained by using a low-pressure fluidic amplifier 24 in conjunction with an aspirator 25. To fluidic connection 21 of indicator 10 is connected in line 26 which has a T-fitting 27 therein, one branch of which connects the output receiver 28 of fluidic amplifier 24 and the other branch of which connects to aspirator connection 29 of fluidic aspirator 25. A source of fluidic pressure 30, illustratively providing pressure at 20 inches of water, is connected through line 31 having a T-joint 32 therein, one branch of which connects to supply to 33 of fluidic amplifier 24, and the other branch of which connects through valve 34 ot pressure inlet 35 of aspirator 25. Valve 34 may be adjusted to regulate the supply of fluid flow through aspirator 25 to atmosphere 37 so that about one inch of water of aspiration pressure at aspirator pick-off 29 is obtained. Control tube 38 of fluidic amplifier 24 has supplied to input 39 thereof a fluidic signal representing an on or an off signal; in the indicator de-activated condition, a fluidic pressure is supplied to input 39 which reduces the output pressure at receiver 28 of fluidic amplifier 24 to approximately zero. In this condition, the aspiration pressure at pick-off 29 bleeds fluidic pressure from recess 12 through connection 21 and line 26 so that the ball 13 is thereby withdrawn to end 19 of indicator 10. Pneumatic restriction 40 in some form is to be placed effectively in series between receiver 28 and T-fitting 27 so that aspiration from pick-off 29 will bleed from fitting 21; T-fitting 27 itself may provide sufficient restriction by virtue of its configuration and dimensions.

In the activated condition of indicator 10, the signal applied to input 39 of fluidic amplifier 24 is reduced so that the pressure at receiver 28 rises to illustratively 6–8 inches of water. The pressure of 6–8 inches of water is sufficient to overcome the aspiration bias of 1 inch of water, with a net resultant pressure of 5–7 inches of water at a T-fitting 27 communicated through line 26 and fitting 21 to interior recess 12 of indicator 10; this communication forces ball 13 against lens 16, thereby illuminating lens 16. Some form of a pneumatic restriction 41 is to be in series between pick-off 29 and T-fitting 27 to insure substantial transfer of signal pressure from receiver 28 to fitting 21.

It may be noted that a constant positive pressure supply may conveniently be used, in combination with a signal-controlled source of negative pressure to actuate the indicator. With this combination, the indicator is illuminated at all times except when triggered by a signal to the non-illuminated condition.

While there has been shown what is considered to be a preferred embodiment of the invention, it will be manifest that many changes and modifications may be made therein without departing from the essential spirit of the invention. It is intended, therefore, in the annexed claims to cover all such changes and modifications as fall within the true scope of the invention.

What is claimed is:

1. A fluidic indicator comprising:
  a cylindrical housing having a recess therein,
  a translucent lens closing a first end of said cylindrical housing having a concave inner face bounding said recess,
  a fluidic connection sealably connected to the second end of said housing,
  a member movably disposed in said recess having at least a portion of its surface adapted to conformably abut concave inner face of said lens, and said member having a dimension slightly smaller than the diameter of said recess providing for a clearance therebetween so that said member may freely slide between said first and second ends of said housing with said portion of said surface of said member adapted to conformably abut said concave inner face of said lens having a surface exhibiting a selected visible shade of color, whereby a source of fluidic pressure applied to said fluidic connection operates to move said member proximate to said lens thereby providing a condition of visible indication while a source of negative pressure less than atmospheric pressure applied to said fitting will operate to move said member proximate said second end of said housing thereby terminating said visible indication, said lens being formed with an aperture therethrough axially aligned with said housing to permit ingress and egress of fluid to the portion of said recess opening and closing between said member and said lens.

2. The indicator of claim 1 wherein said lens has a concave spherical shape of inner face and said member has a spherical contour conforming therewith.

3. The indicator of claim 2 wherein said member is spherical and has a diameter sufficiently smaller than the diameter of said recess to permit movement along said recess between said first and second ends of said cylindrical housing, while presenting a sufficient small clearance between said member and the inner wall of said recess to effect positive movement of said member in response to application of a low pressure differential across said member.

4. The indicator of claim 1 wherein a constant negative pressure bias is applied in parallel with the positive pressure output of a fluidic switching element to said fluidic connection whereby said indicator is darkened at times said positive pressure output of said fluidic switching element is absent and is illuminated when said positive pressure output is present.

5. The indicator of claim 4 wherein said aspiration bias is in the order of one inch of water and the de-activating output of said fluidic switching element is several inches of water.

6. The indicator of claim 2 wherein said lens has an outer convex shape adapted to magnify the illumination of said lens provided by the abutment of said member.

7. The indicator of claim 2 wherein said spherical contour has a fluorescent surface.

References Cited

UNITED STATES PATENTS

| | | | |
|---|---|---|---|
| 2,753,835 | 7/1956 | Gehrig | 116—124 |
| 3,024,655 | 3/1962 | Dwyer et al. | 73—209 |
| 3,134,445 | 5/1964 | Hotchkiss | 170—160.22 |
| 3,220,375 | 11/1965 | Gruber et al. | 116—70 |
| 3,237,591 | 3/1966 | Pichel | 116—124 |
| 3,241,514 | 3/1966 | Grimland | 116—70 |
| 3,368,751 | 2/1968 | Merrill | 116—114 XR |

LOUIS J. CAPOZI, *Primary Examiner.*

U.S. Cl. X.R.

73—209